United States Patent [19]

Wineland et al.

[11] Patent Number: 4,706,630
[45] Date of Patent: Nov. 17, 1987

[54] CONTROL SYSTEM FOR ENGINE OPERATION USING TWO FUELS OF DIFFERENT VOLATILITY

[75] Inventors: Richard J. Wineland, Dearborn; Roberta J. Nichols, Plymouth; Eric L. Clinton, Southfield, all of Mich.

[73] Assignee: Ford Motor Company, Dearborn, Mich.

[21] Appl. No.: 827,123

[22] Filed: Feb. 7, 1986

[51] Int. Cl.⁴ .............................................. F02D 41/04
[52] U.S. Cl. .................................. 123/478; 123/491; 123/494; 123/575; 123/1 A
[58] Field of Search ............... 123/478, 480, 488, 491, 123/494, 1 A, 575

[56] References Cited

U.S. PATENT DOCUMENTS

| 3,750,635 | 8/1973 | Hoffman et al. | 123/357 |
| 4,031,864 | 6/1977 | Crothers | 123/1 A |
| 4,323,046 | 4/1982 | Barber | 123/575 |
| 4,369,736 | 1/1983 | Ito | 123/1 A |
| 4,391,253 | 7/1983 | Ito | 123/478 |
| 4,438,749 | 3/1984 | Schwippert | 123/494 |

FOREIGN PATENT DOCUMENTS

| 56-165772 | 12/1981 | Japan. | |
| 57-76231 | 5/1982 | Japan | 123/478 |
| 58-28557 | 2/1983 | Japan | 123/1 A |

Primary Examiner—Andrew W. Dolinar
Attorney, Agent, or Firm—Peter Abolins; Keith L. Zerschling

[57] ABSTRACT

A method for controlling the amount of fuel mixture, including a first and second fuel of different volatility, to be supplied to an internal combustion engine includes calculating a base amount of fuel mixture needed to achieve a desired air to fuel ratio at a predetermined engine operating condition. Such a base amount of fuel mixture is modified as a function of the temperature of the internal combustion engine and is a function of the percentage of the first fuel.

4 Claims, 7 Drawing Figures

FIG.3B

80:
(FUEL 2)
(FUEL 3)
LEAN MULTIPLIER = (1-PM)*FN901+FN905*PM
PULSEWIDTH MODIFIER = FN908*(FN900*
FN351+(1-FN351)*FN929)*WOTEN*
LEAN MULTIPLIER
EFIPW = (BASEPW * PULSEWIDTH MOD-
IFIER) + TFCHG + OFFSET

81: FUEL 4 PULSEWITH CALCULATION SUBROUTINE

82: VIP ROUTINE SCHEDULER

83: GLOBAL TIMER CONTROL

84: CLOSED LOOP IDLE SPEED

85: VIP ROUTINE SCHEDULER

86:
(SPARK)
SAF = (FN137 * FN919 +(1-FN137)
*FN910) + FN136 + FN913
+ FN139 + FN912 + KSI

87: CRANK/UNDERSPEED/NORMAL MODE ROUTINE

88: WIDE OPEN A/C CUTOFF LOGIC

89: KAY CALCULATION FOR SPARK OUTPUT

*FN 414*

*MODULATOR TITLE - MULTIPLIER FOR THE PERCENTAGE OF METHANOL*
*MODULATOR PURPOSE - TO DETERMINE THE AMOUNT OF METHANOL AND GASOLINE BLEND*
*INPUT PARAMETER - SENSOR FREQUENCY*
*OUTPUT PARAMETER - PERCENTAGE METHANOL*

*FN 137*

MODULATOR TITLE — SPARK INTERPOLATION FACTOR FOR METHANOL PERCENTAGE
MODULATOR PURPOSE — MODULATE SPARK ADVANCE BASED ON PERCENTAGE METHANOL
INPUT PARAMETER — PM (PERCENTAGE METHANOL)
OUTPUT PARAMETER — SPARK INTERPOLATION FACTOR

*GRAPHIC DESCRIPTION*

FN351

MODULATOR TITLE — VOLATILITY INTERPOLATION FACTOR FOR COLD START AND COLD OPERATION FUEL ENRICHMENT
MODULATOR PURPOSE — PROVIDE FUEL ENRICHMENT MULTIPLIER BASED ON PM
INPUT PARAMETER — PM (PERCENTAGE METHANOL)
OUTPUT PARAMETER — VOLATILITY INTERPOLATION FACTOR

GRAPHIC DESCRIPTION

CONTROL SYSTEM FOR ENGINE OPERATION USING TWO FUELS OF DIFFERENT VOLATILITY

BACKGROUND OF THE INVENTION

This application relates to commonly assigned, copending applications Ser. No. 826,953 filed 2/7/86 "Control System for Engine Operation Using Two Fuels of Different Volumetric Energy Content" and Ser. No. 826,959 filed 2/7/86 entitled "Spark Timing Control of Multiple Fuel Engine", filed on even date herewith.

1. Field of the Invention

This invention relates to a method for controlling the utilization of a fuel mixture containing more than one type of fuel in an internal combustion engine.

2. Prior Art

U.S. Pat. No. 3,750,635 issued to Hoffman et al teaches a fuel control system for an internal combustion engine that may use one of a number of different grades of fuel, such as diesel and turbine fuels. The system uses a light source and a pair of photocells to measure the light transmission of the particular fuel being used to adjust the amount of fuel supplied to the engine.

U.S. Pat. No. 4,369,736 issued to Ito teaches a control system for an engine using a blend of gasoline and alcohol in which an increasing amount of hot air is admitted to the induction system as the concentration of the alcohol increases, thereby providing proper atomization of the fuel. An alcohol sensor detects the concentration of the alcohol in the fuel and provides a signal to an electronic control unit which opens a control valve to allow more hot air heated by the exhaust manifold to pass into the nose of the air cleaner and then to the carburetor. The alcohol sensor detects the concentration of alcohol by a change in the electrostatic capacity of the fuel.

U.S. Pat. No. 4,323,046 issued to Barber teaches a dual fuel blend system having a first liquid storage tank for containing a petroleum fuel and a second liquid storage tank for containing a nonpetroleum fuel.

U.S. Pat. No. 4,438,749 issued to Schwippert teaches the use of a fuel sensor using an index of light refraction to determine the ratio of gasoline and alcohol in a particular fuel. The sensor emits a signal as a variable for the control of a dosage device of the air fuel ratio. An electronic circuit is connected to the sensor to control the dosage device in accordance with the determined state or composition.

Japanese publication No. 56-165772 teaches a system for adjusting the ignition timing of an engine which is supplied with a mixture of gasoline and alcohol. An alcohol concentration sensor using a capacitor provides a signal to an alcohol concentration detection circuit to advance the ignition timing when the concentration of the alcohol has exceeded a predetermined amount.

U.S. Pat. No. 4,031,864 issued to Crothers teaches supplying an engine with a multiple fuel which is phase separable to form a two-phase liquid and supplying the combustion engine with liquid selected from the liquid withdrawn from the upper phase, the liquid withdrawn from the lower phase, and liquid withdrawn from both the upper phase and the lower phase.

There still remains a need for an improved method of controlling the amount of a fuel mixture having at least two different fuels, to be supplied to an internal combustion engine. These are some of the problems this invention overcomes.

SUMMARY OF THE INVENTION

This invention includes a method for controlling the amount of a fuel mixture having a first and second fuel of different volatility to be supplied to an internal combustion engine. The method includes determining the amount of air charge per intake stroke of the internal combustion engine and calculating a base amount of fuel mixture needed to achieve a desired air fuel ratio at a predetermined engine operating condition. The base amount of fuel mixture needed to achieve the desired air fuel ratio is modified as a function of the temperature of the internal combustion engine and is a function of the percentage of the first fuel.

BRIEF DESCRIPTION OF THE DRAWINGS

FIGS. 3A and 3B show a more detailed block logic flow diagram than FIG. 2 of a method for controlling the amount of fuel mixture, having more than one fuel type, in accordance with an embodiment of this invention;

DETAILED DESCRIPTION OF THE INVENTION

Figure 1:
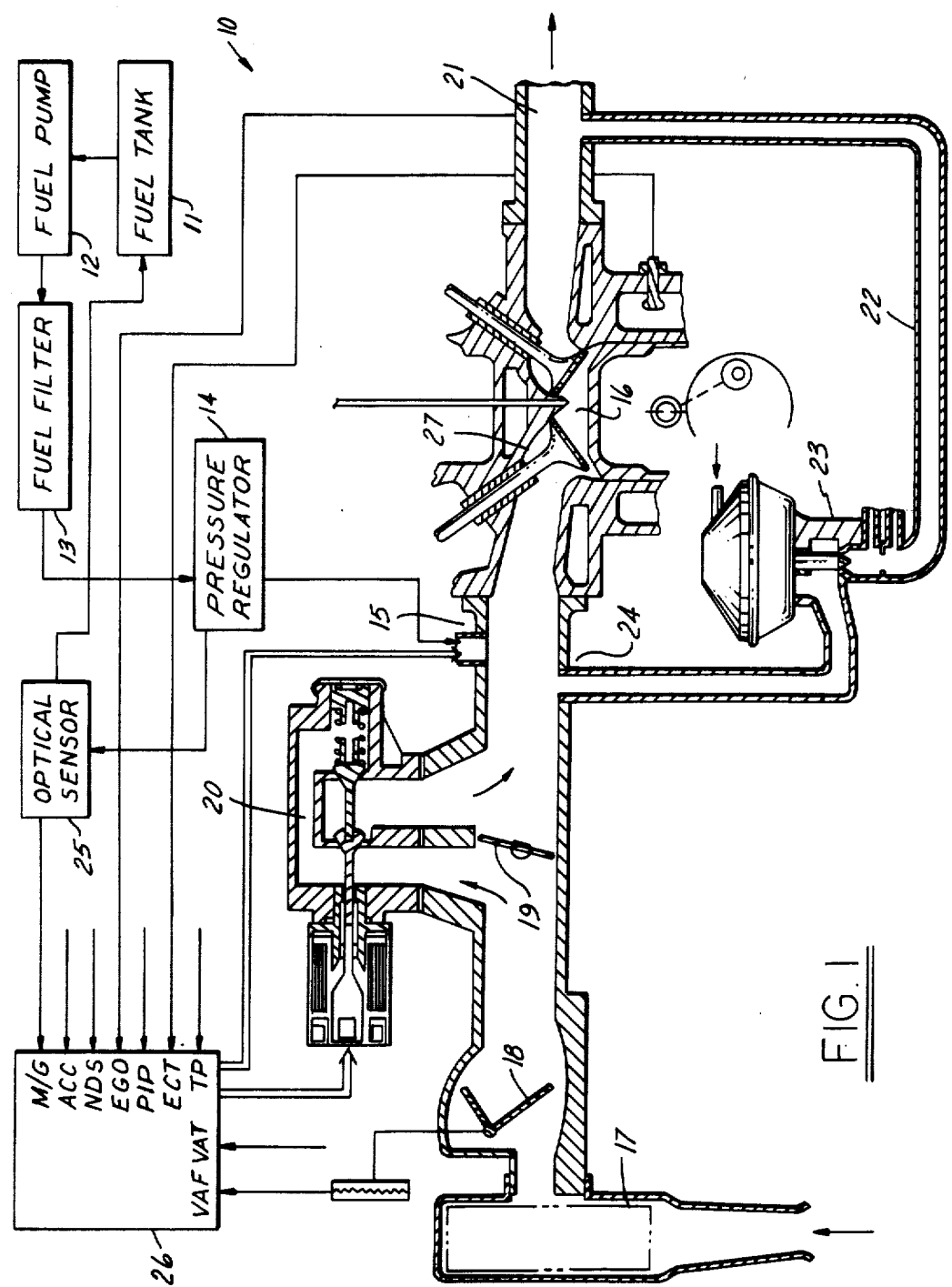
FIG. 1 is a schematic diagram, partly in block form and cross section, of a fuel supply system for an internal combustion engine in accordance with an embodiment of this invention.

Referring to FIG. 1, an internal combustion engine system 10 includes a fuel tank 11 which supplies fuel through a fuel pump 12 to the series connection of a fuel filter 13, a fuel pressure regulator 14 and a fuel intake port 15 to be combined with air for introduction into cylinder 16. The air flow is through an air cleaner 17 past an air flow meter 18 and past a throttle body 19 or an idle speed control air bypass valve 20. Exhaust gas recirculation flow is from an exhaust manifold 21 through a passage 22 to an exhaust gas recirculation valve 23 and then through the intake manifold 24 into the intake of the cylinder 16.

An optical sensor 25 monitors the index of refraction of the fuel flowing from fuel tank 11 to fuel pump 12, fuel filter 13, pressure regulator 14, and fuel intake port 15. In particular, the composition of the return fuel from the pressure regulator 14 is measured by the optical sensor 25 and returned to the fuel tank 11.

Optical sensor 25 produces a voltage indicative of the amounts of two fuels in the fuel mixture passing from fuel pressure regulator 14 to fuel intake port 15. An optical sensor pick up structure for sensing the index of refraction of a fuel mixture to determine the proportion of two fuel types in the fluid mixture is taught, for example, in U.S. Pat. No. 4,438,749 issued to Schwippert on Mar. 27, 1984, the disclosure of which is incorporated by reference herein.

An electronic engine control module 26 includes a microprocessor which interprets input data from a number of sensors, and provides the proper actuator response. Table 1 shows the control module input sensor/switch nomenclature.

TABLE 1

| SENSOR/SWITCH NOMENCLATURE | |
|---|---|
| PIP | Profile Ignition Pick-up |
| TP | Throttle Angle Position |
| ECT | Engine Coolant Temperature |
| VAF | Vane Air Flow Sensor (Inducted Engine Air) |
| A/C | Air Condition Clutch (On or Off Switoh) |
| N/D | Neutral/Drive Switch |
| VAT | Vane Air Temperature |

Based on information received from the sensors listed in Table 1, the electronic control module 26 provides an output signal to the idle speed control air bypass valve 20, fuel intake ports 15 and spark timing. Control of engine operation by an electronic control module is taught in U.S. Pat. No. 3,969,614 issued to Moyer et al on July 13, 1976, the disclosure of which is incorporated by reference herein.

In operation, an electronic engine control strategy of control module 26 is used to operate an internal combustion engine. The control strategy is divided into two portions: a base engine strategy and a modulator strategy.

The base engine strategy provides the control logic for a fully warmed engine during city and highway driving. The base engine strategy is divided into the following five exclusive engine operating modes, to achieve optimum driving condition:
1. Crank mode
2. Underspeed mode
3. Closed throttle mode
4. Part throttle mode
5. Wide open throttle mode The closed throttle, part throttle, and wide open throttle mode are considered parts of the engine run mode. A mode scheduler in the computer determines which mode currently exists. The modulator strategy modifies the base engine strategy to correct for uncommon or transient engine operating conditions. These include cold and excessively hot engine temperatures.

In accordance with an embodiment of this invention, a flexible fuel strategy is part of the base engine strategy. This flexible fuel strategy calculates a desired air/fuel ratio of a fuel mixture of gasoline and alcohol based on the percentage of alcohol, and determines the correct spark timing and fuel amount for the various engine operating modes.

The flexible fuel strategy allows an internal combustion engine to operate on any fuel mixture of alcohol and gasoline, such as methanol and gasoline, or ethanol and gasoline. Since methanol and gasoline have different combustion burn rates, volumetric energy content, vapor pressure, octane, and heat of vaporization, the strategy changes engine operating parameters, such as air bypass, fuel flow, and ignition timing to provide optimum engine operation. The two fuels each have unique physical properties, such as refractive index, that can be detected by a sensor. The refractive index behaves in a predictable manner when the two fuels are mixed. The fuel tank can be fully or partially filled with, for example, methanol or gasoline in any proportion. The desired air/fuel ratio may be optimized for such engine operating characteristics as fuel economy and driveability.

Optical sensor 25 provides an output signal, which characterizes the index of refraction by a frequency, to the electronic engine control module 26. The flexible fuel strategy synchronizes the output from optical sensor 25 with an internal machine clock of the engine control module 26 to generate a frequency characterizing the optical sensor output signal. For example, as shown in block 72 of FIG. 3A, the frequency can be equal to one divided by the product of two times the difference (DELMG) between the present machine time of electronic engine control module 26 (i.e. the end of a pulse), and the last machine interrupt time from the optical sensor's output (i.e. the beginning of the pulse). The frequency thus calculated characterizes the percentage of methanol (PM) in the fuel mixture. The following equation is used in the software calculation:

$$PM = ((1 - FMS) \times FN414) + (FMS \times FPM)$$

wherein:
PM = Percentage methanol
FN414 = Predetermined relationship between the percentage of methanol and the sensor frequency (see FIG. 4)
FPM = Predicted or known percentage of methanol
FMS is chosen to be a constant value of either 0 or 1 and allows the percentage of methanol to be calculated by the known percentage methanol value (FPM) or by a sensor value. When FMS equals 0, the percentage of methanol is determined by the output signal of optical sensor 25. When FMS equals 1, the electronic engine control module calculates the percentage of methanol based on the known percentage methanol value (FPM).

The stoichiometric air fuel ratio (AFR1) is then calculated based on percentage methanol. This calculation is linearly interpolated between the stoichiometric value of 6.4 for methanol and 14.64 for gasoline. Where:

$$AFR1 = \text{calculated air fuel ratio for}$$
$$\text{stoichiometry} = (6.4 \times PM) + (14.64 \times (1 - PM))$$

Figure 2:
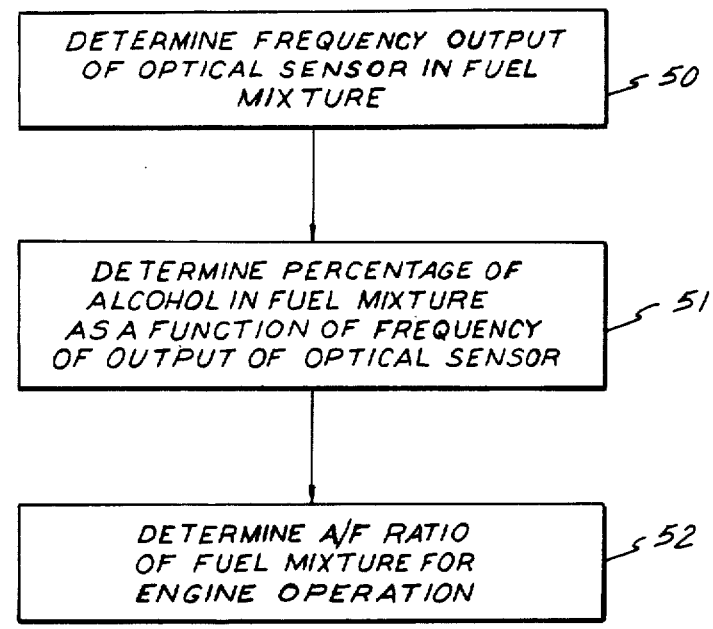
FIG. 2 is a block logic flow diagram of a method for controlling the amount of fuel mixture, having more than one fuel type, in accordance with an embodiment of this invention.

The general flow diagram for the flexible fuel strategy is shown in FIG. 2. Block 50 determines the frequency output of optical sensor 25 in response to the composition fuel mixture. The logic flow then goes to block 51 which determines the percentage of alcohol in the fuel mixture as a function of frequency of the output of optical sensor 25. Logic flow continues to block 52 which determines the air fuel ratio of the fuel mixture for optimum engine operation. The flexible fuel strategy is stored in the background routine modules of the control strategy. Tables 2 and 3 give the definition of all the variable names used in this strategy and shown in FIG. 3A and FIG. 3B.

TABLE 2

| NAME | DEFINITION | UNITS |
|---|---|---|
| AFR1 | Stoichiometric Air Fuel Ratio | |
| AO | Fuel Injector Slope | LBMF/Sec |
| ARCHG | Air Charge Per Intake Stroke | LBMA/Intake |
| AVAMVL | Average Vane Air Meter Value (Intake Air Flow) | LBS/Min |
| BASEPW | Injectors Base Pulsewidth | Sec |
| CARCHG | Cranking Air Charge Per | LBMA/Intake |

TABLE 2-continued

| NAME | DEFINITION | UNITS |
|---|---|---|
| CRANKING PW | Intake Stroke Injectors Cranking Pulsewidth | Sec |
| DELMG | Time Delta for Methanol/ Gasoline Sensor Input | Sec |
| ECT | Engine Coolant Temperature | Degrees F. |
| EFIPW | Final Injectors Pulsewidth | Sec |
| EM | Enrichment Multiplier | |
| FMS | Forced Methanol Sensor Value | |
| FPM | Forced Percentage of Methanol | % |
| KS1 | Spark Adder | Degrees |
| N | Engine Speed | RPM |
| OFFSET | Injector Pulsewidth Offset | Sec |
| PM | Percentage Methanol | % |
| SAF | Final Spark Advance | Degrees |
| TFCHG | Transient Fuel Pulsewidth | Sec/Inj |
| WOTEN | Wide Open Throttle Fuel Enrichment Multiplier | |
| Y | Normal Part Throttle Spark Multiplier | |

TABLE 3

| NAME | DEFINITION |
|---|---|
| FN136 | Cold Air Spark Adder Based on Inlet Temperature |
| FN137 | Normalized Spark Interpolation Factor Based on Percentage Methanol |
| FN139 | Wide Open Throttle Spark Adder Based on Engine Speed |
| FN349 | Cranking Fuel Enrichment Multiplier for Methanol Based on ECT |
| FN350 | Cranking Fuel Enrichment Multiplier for Gasoline Based on ECT |
| FN351 | Volatility Interpolation Function Based on Percentage Methanol |
| FN414 | Mutliplier for Percentage of Methanol Based on Sensor Frequency |
| FN900 | Gasoline Fuel Enrichment Multiplier for a Cold Engine Based on ECT Input |
| FN901 | Lean Fuel Multiplier for Methanol as a Function of Engine Speed and Load |
| FN905 | Lean Fuel Multiplier for Gasoline as a Function of Engine Speed and Load |
| FN908 | Fuel Enrichment Multiplier - as a Function of ECT and Time Since Crank |
| FN910 | MBT Base Spark Advance Table for Gasoline as a Function of Engine Speed and Load |
| FN912 | Cold Spark Advance Adder Table as a Function of ECT and Load |
| FN913 | EGR Spark Advance Adder Table Based on Engine Speed and Load |
| FN919 | MBT Base Spark Advance Table for Methanol as a Function of Engine Speed and Load |
| FN929 | Methanol Fuel Enrichment Multiplier for Cold Engine Based on ECT Input |

Figure 3A:
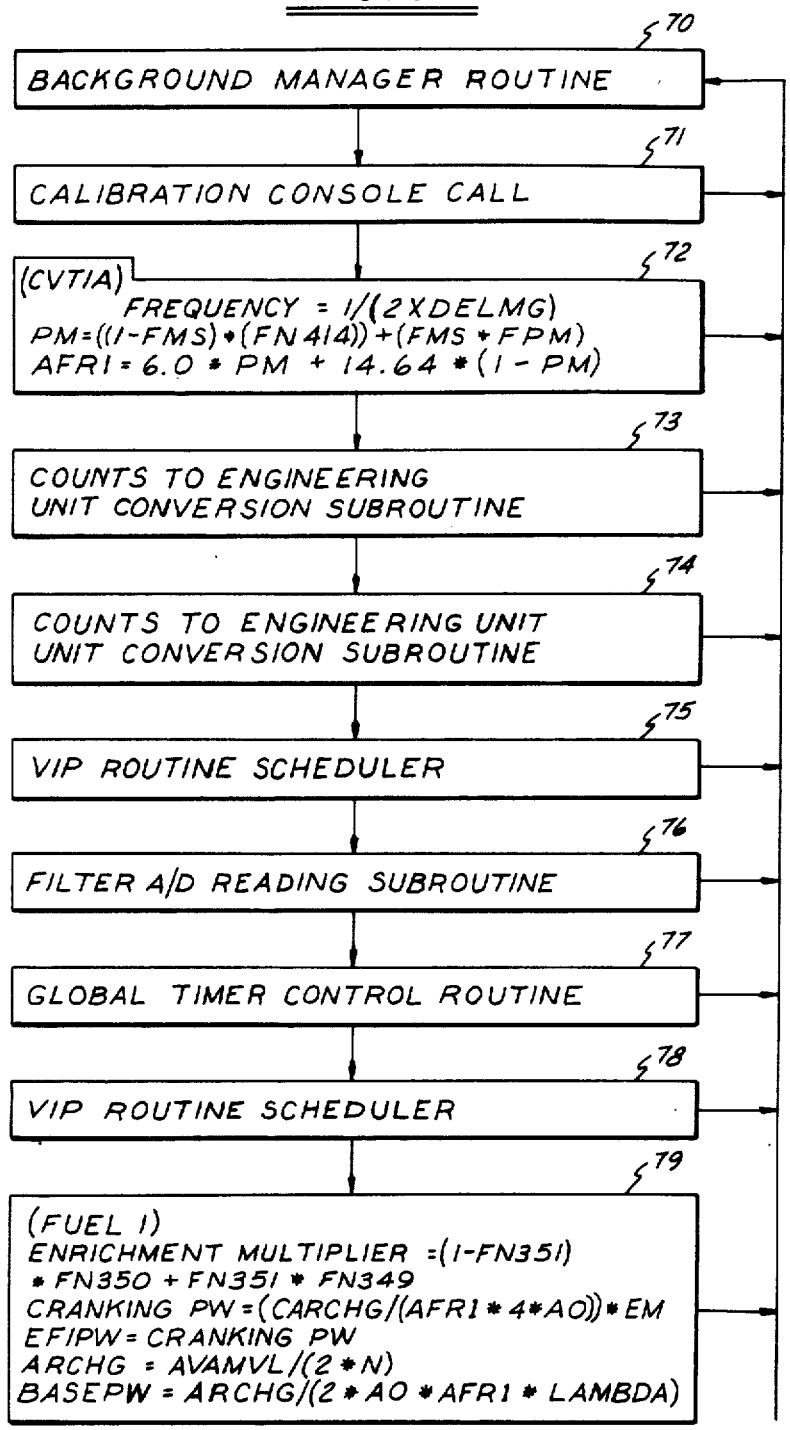

FIGS. 3A and 3B show the particular equations and the logical sequence which are part of the flexible fuel strategy. Blocks 70 through 88 are sequentially logically coupled to the next block in numerical order. Block 89 is coupled back to block 70. Each of blocks 71 through 88 also has an output coupled back to block 70 which performs an overall management of the logic flow.

Figure 4:
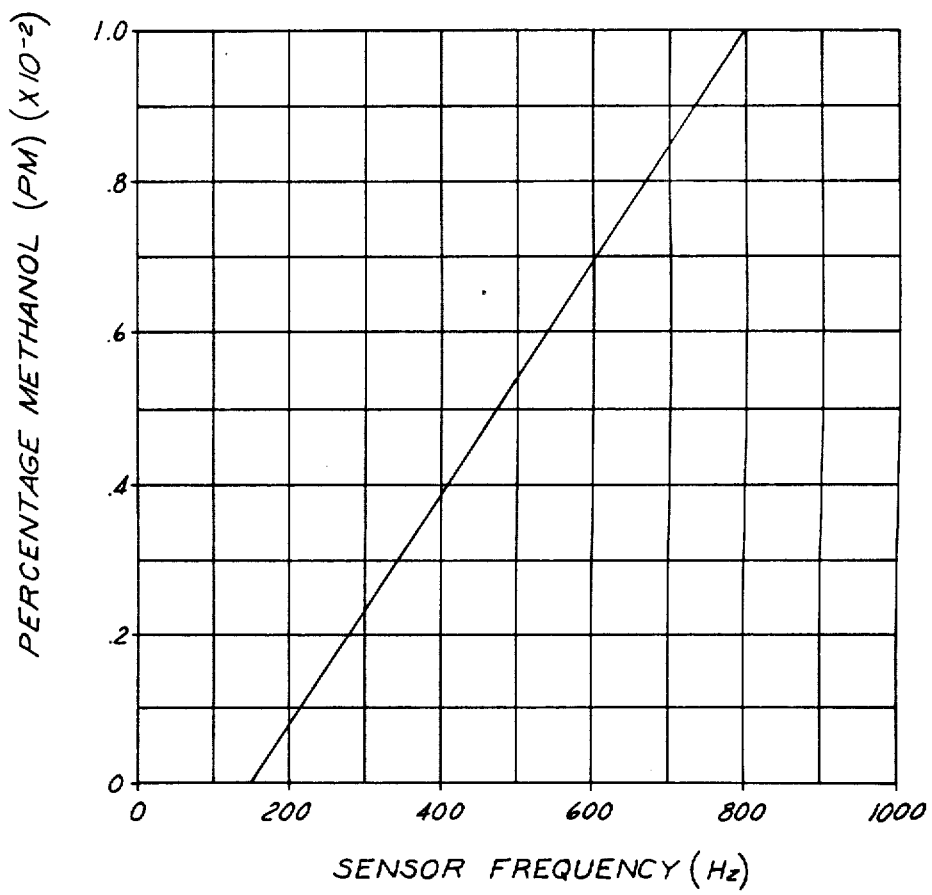
FIG. 4 is a graphical representation of sensor frequency versus percentage of methanol in the fuel mixture.

CTV1A block 72 is used to convert sensor input values to engineering units and correlates the methanol sensor output with the percentage methanol. Function FN414, shown in FIG. 4, shows the correlation between the sensor frequency and the percentage methanol. Optimum air fuel ratio is calculated based on the percentage of methanol. This percentage is normalized to a value between zero and one. The normalized value is used to interpolate between the amount of fuel necessary if the mixture were entirely gasoline or entirely methanol.

Fuel 1 block 79 is used to calculate the cranking and base fuel pulsewidth of a signal used to activate a fuel injector. The block calculates the cranking fuel pulsewidth by using the value of stoichiometric air fuel ratio (AFR1), enrichment multiplier (EM) and cranking air charge per intake stroke (CARCHG) as shown in FIG. 3A. The enrichment multiplier is temperature and fuel composition dependent where the enrichment value decreases as AFR1 or engine temperature increases.

During the cranking mode of engine operation, a desired air fuel ratio is established and a predetermined function relates the amount of fuel needed as a function of engine operating temperature. The amount of fuel mixture is compensated to take into account the different volatility of the fuel mixture constituents at different engine operating temperatures. First, the amount of methanol needed for a desired air fuel ratio at the engine operating temperature is determined. Second, the amount of gasoline needed for a desired air fuel ratio at the engine operating temperature is determined. Then there is an interpolation between the amounts of gasoline and methanol determined as a function of the percentage of methanol in the actual fuel mixture.

The fuel injector pulsewidth equation for use in the crank mode is shown in Fuel 1 block 79 of FIG. 3A. The pulsewidth decreases in value as the stoichiometric air fuel ratio increases. The cranking pulsewidth is determined by the equation:

$$\text{Cranking PW} = (CARCHG/(AFR1 \times 4 \times AO)) \times EM$$

The final pulsewidth for the cranking mode is:

$$EFIPW = \text{Cranking PW}$$

Figure 6:
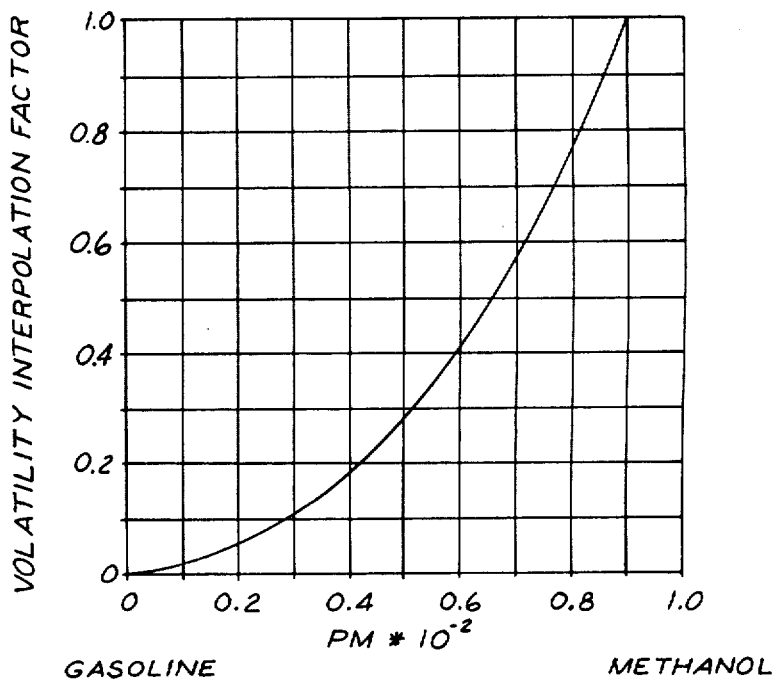
FIG. 6 is a graphical representation of a volatility interpolation factor for cold start and cold operation fuel enrichment.

The fuel injector pulsewidth equation for use in the run mode is shown in Fuel 3 block 80 of FIG. 3B. The pulsewidth is based on the lean multiplier, AFR1, BASEPW, and ARCHG value as shown in FIGS. 3A and 3B. The lean multiplier is obtained by interpolating between methanol and gasoline fuel tables for the desired equivalence ratio. These tables indicate the amount of fuel necessary for a desired air fuel ratio as a function of engine speed and load. The lean multiplier is equal to $(1 - PM) + FN901 + FN905*PM$, where PM is the percent methanol and the functions FN901 and FN905 take into account differences in the flammability limits of fuel mixtures with various percentages of methanol. This equation produces a linear interpolation between functions defining desired air fuel ratios of the first and second fuels (i.e. FN901 and FN905). The fuel pulsewidth mofidier equation of block 80 is equal to FN908*(FN900*FN351*(1−FN351)*FN929)*WOTEN*LEAN MULTIPLIER. This equation produces a non-linear interpolation between the cold fuel enrichment functions (FN900 and FN929) through the use of a non linear function FN351. In particular, as defined in Table 3, FN908 is a fuel enrichment multiplier as a function of engine coolant temperature and time duration since last engine cranking, FN900 is a gasoline fuel enrichment multiplier for a cold engine based on engine coolant temperature input, and FN929 is a methanol fuel enrichment multiplier for cold engine based on engine coolant temperature input. FIG. 6 is a graphical description of the volatility interpolation factor as a non linear function, FN351, of the percentage methanol of the fuel mixture.

During the run mode of engine operation, a desired air fuel ratio is established and a predetermined function relates the amount of fuel needed as a function of engine speed, engine load and engine operating temperature. The amount of fuel mixture is compensated to take into account the different volatility and flammability limits of the fuel mixture constituents at different engine operating temperatures. First, the amount of gasoline needed for the desired air fuel ratio at a particular engine speed and load is determined. Second, the amount of methanol needed for the desired air fuel ratio at a particular engine speed and load is determined. Then there is an interpolation between the amounts of gasoline and methanol determined as a function of the percentage of methanol in the actual fuel mixture. Functions FN901 and FN905 take into account the difference in flammability limits.

The spark advance is calculated in block 86 by interpolating between the desired spark advance for methanol (FN919) and the desired spark advance for gasoline (FN910) based on percentage methanol. Each spark table shows desired spark advantage as a function of engine speed and load. That is, controlling the amount of spark advance for such a fuel mixture includes sensing a parameter related to the percentage of one of the fuels in the fuel mixture, determining a base spark advance, and adjusting the base spark advance as a function of the percentage.

Figure 5:
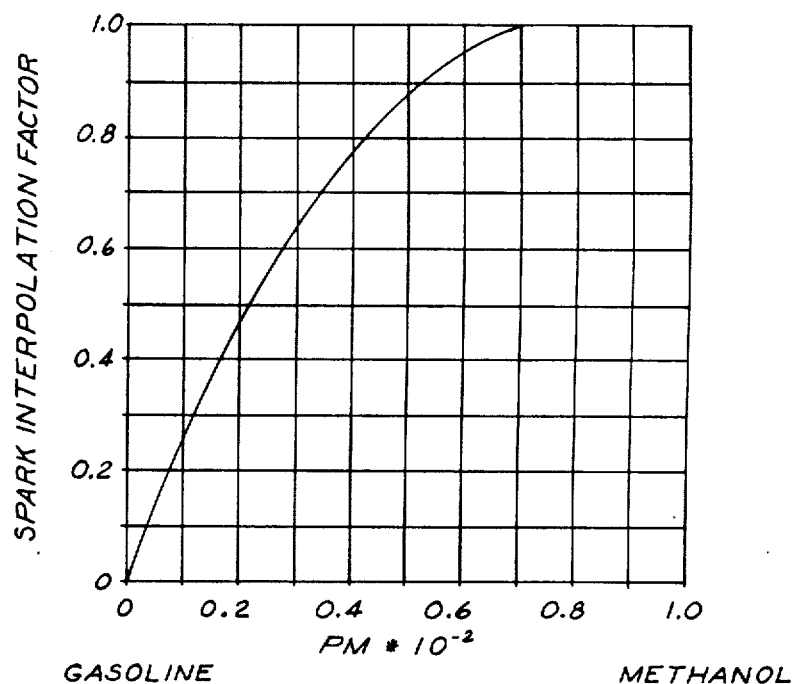
FIG. 5 is a graphical representation of a spark interpolation factor versus percentage methanol in the fuel mixture.

Refering to FIG. 5, function FN137 graphically illustrates a non linear spark interpolating function for compensating spark timing as a function of percentage methanol in the fuel mixture. The spark interpolating function has a substantial change between 0% and 50% of methanol in the fuel mixture and very little change between 50% and 100% of methanol in the fuel mixture. In part, the spark interpolating function of FN137 takes into account the non linear effects the burn rate and octane of fuel mixtures having different percentages of methanol. The non linear spark interpolating function is used in accordance with the equation illustrated in block 86 of FIG. 3B:

Spark Advance Factor $(SAF) =$ $(FN137)*FN919 = (1 - FN137)*FN910) + FN136 + FN913 + FN139 + FN912 + KS1$ As noted in Table 3, FN919 provides the desired spark advance for methanol as a function of engine speed and load.

During the crank mode, the spark advance is advantageously a fixed value such as for example, 10° before top dead center of piston and cylinder relative positions. During the run mode, the spark advance is dependent upon predetermined factors which are functions of the temperature of the air entering the engine, the percentage of methanol in the fuel mixture, the engine speed, the engine load, and the engine coolant temperature.

It may be advantageous to use fuel composition sensors other than optical sensors. For example, fuel composition sensors may be based on the dielectric constant of the fuel mixture. Alternatively, by monitoring the fuel quantity and type introduced into the fuel mixture, the fuel mixture composition can be calculated and the information supplied to the electronic engine control module. Engine operation can also be controlled using feedback engine control in combination with such engine operating parameter sensors as exhaust gas oxygen sensors or combustion pressure sensors. That is, determining the percentage of the first fuel in the fuel mixture can be deduced from characteristics of engine operation in response to applied engine control parameters.

Various modifications and variations will no doubt occur to those skilled in the arts to which this invention pertains. For example, the particular processing of the signals from the fuel composition sensor may be varied from that disclosed herein. These and all other variations which basically rely on the teachings through which this disclosure has advanced the art are properly considered within the scope of this invention.

We claim:

1. A method for controlling the amount of a fuel mixture, including a first and second fuel of different volatility, to be supplied to an internal combustion engine during both open loop and closed loop operation, said method including the steps of:

determining the amount of air charge per intake stroke of the internal combustion engine;

determining the percentage of the first fuel in the fuel mixture;

calculating a stoichiometric air to fuel ratio of the fuel mixture based on the percentage of the first fuel in the fuel mixture;

calculating a base amount of fuel mixture needed to achieve the stoichiometric air to fuel ratio at a predetermined engine operating condition using the calculated stoichiometric air to fuel ratio and the amount of air charge; and modifying the above calculated base amount of fuel mixture needed to achieve the stoichiometric air to fuel ratio as a function of the engine coolant temperature of the internal combustion engine, engine speed and as a function of the percentage of the first fuel.

2. A method for controlling the amount of the fuel mixture supplied to an internal combustion engine as recited in claim 1 further comprising the step of:

determining the amount of fuel mixture to be provided during cranking of the internal combustion engine as a function of air fuel ratio at stoichiometry, percentage of the first fuel and engine coolant temperature.

3. A method for controlling the amount of the fuel mixture supplied to an internal combustion engine as recited in claim 2 further comprising a step of determining the pulse width (PW) of a fuel injection during cranking is in accordance with the formula:

$$PW_{Cranking} = (CARCHG/(AFR1 \times 4 \times AO)) \times EM$$

wherein:

CARCHG is the magnitude of the cranking air charge per intake stroke;

AFR1 is the stoichiometric air fuel ratio;

AO is the fuel injector slope relating amount of fuel injected versus amount of time injector is open; and EM is the enrichment multiplier which is a calculated value determined as a function of a volatility interpolation factor, percentage of first fuel and engine coolant temperature.

4. A method for controlling the amount of the fuel mixture supplied to an internal combustion engine as recited in claim 1 further comprising the step of:

determining the amount of fuel mixture to be provided during underspeed operation of the internal combustion engine as a function of air fuel ratio at stoichiometry, engine speed, engine load, percent of the first fuel and engine coolant temperature.

* * * * *

UNITED STATES PATENT AND TRADEMARK OFFICE
CERTIFICATE OF CORRECTION

PATENT NO. : 4,706,630

DATED : November 17, 1987

INVENTOR(S) : Richard J. Wineland et al.

It is certified that error appears in the above-identified patent and that said Letters Patent are hereby corrected as shown below:

Column 7, line 45, substitute --+-- for "=".

Signed and Sealed this

Seventh Day of June, 1988

Attest:

DONALD J. QUIGG

Attesting Officer

Commissioner of Patents and Trademarks